United States Patent [19]
Bögert et al.

[11] Patent Number: 5,516,352
[45] Date of Patent: May 14, 1996

[54] APPARATUS FOR COOLING NECK RINGS IN A GLASS MOLDING MACHINE

[75] Inventors: Hermann Bögert; Wilhelm Schneider, both of Auetal; Heinrich Uhe, Vlotho/Uffeln, all of Germany

[73] Assignee: The firm Hermann Heye, Opernkirchen, Germany

[21] Appl. No.: 961,894

[22] PCT Filed: Mar. 13, 1992

[86] PCT No.: PCT/EP92/00553

§ 371 Date: Jan. 6, 1993

§ 102(e) Date: Nov. 24, 1993

[87] PCT Pub. No.: WO92/21624

PCT Pub. Date: Dec. 10, 1992

[30] Foreign Application Priority Data

Jun. 7, 1991 [DE] Germany .......................... 41 18 682.6

[51] Int. Cl.⁶ .................. C03B 9/38; C03B 11/12
[52] U.S. Cl. .................. 65/265; 65/267; 65/319; 65/355; 65/356; 65/359
[58] Field of Search ............................ 65/265, 267, 319, 65/355, 356, 359

[56] References Cited

U.S. PATENT DOCUMENTS

| | | | |
|---|---|---|---|
| 3,849,101 | 11/1974 | Wythe et al. | 65/265 |
| 3,888,647 | 6/1975 | Breeden et al. | 65/319 |
| 4,361,434 | 11/1982 | Schneider | 65/265 |
| 4,388,099 | 6/1983 | Hermening et al. | 65/267 |
| 4,659,357 | 4/1987 | Doud | 65/319 |
| 4,842,637 | 6/1989 | Bolin et al. | 65/265 |
| 5,358,542 | 10/1994 | Johnson et al. | 65/265 |

Primary Examiner—David L. Lacey
Assistant Examiner—Steven P. Griffin
Attorney, Agent, or Firm—Gary A. Hecht

[57] ABSTRACT

Each neck tool half is mounted on a neck tool holder and together they are movable from the illustrated initial position in a parison mold station to a finishing mold station. On each neck tool holder is secured a movable part of a distribution device for cooling air. A stationary part of the distribution device transfers cooling air from a stationary supply device having a valve. Between the stationary and movable parts there is a jointing gap which is inclined to the vertical. The cooling air is blown through nozzle apertures against the outside of the neck tool half.

24 Claims, 7 Drawing Sheets

APPARATUS FOR COOLING NECK RINGS IN A GLASS MOLDING MACHINE

BACKGROUND OF THE INVENTION

1. Field of the Invention

The invention relates to an apparatus for cooling at least one neck ring forming the mouth of a glass container in a glass molding machine. More particularly, the invention relates to an apparatus for cooling a neck ring by directing a supply of cooling fluid, such as air, into contact with an associated neck tool half and possibly into contact with a neck region of the parison held by the neck ring.

2. Description of Related Art

In one known apparatus of this type (DE 36 37 552 C1) each neck tool holder is designed to simultaneously be a distribution device. Cooling air is blown either only through cooling passages in the neck tool halves into a coupling recess of the neck tool (FIGS. 1 and 3 of DE 36 37 552 C1) or additionally through other cooling passages to a neck region of the parison (FIG. 5 of DE 36 37 552 C1). The supply devices for the cooling air are provided as far as up to the pivot shaft of the inversion mechanism of the IS (Individual Section) glass molding machine. This apparatus permits cooling of the neck rings during the whole operating cycle, but it is comparatively expensive.

From DE 30 40 310 C1 it is known to mount the distribution devices (FIG. 2 of DE 30 40 310 C1) on a mold segment holder for the parison mold halves. An inlet to each distribution device is connected permanently to the cooling air box by means of a supply device having coupling passage parts (FIG. 4). The neck tool is then only effectively blasted freely from the outside and cooled through nozzles of the distribution device when the parison mold halves are closed.

From DE 33 36 488 A1 a combined cooling of the parison mold halves and of the neck tool halves is known. The heated cooling air exiting from the cooling passages of the parison mold halves flows into a lower annular groove of the parison mold halves, and from there it passes, only with closed parison mold halves, into slots between vertical external ribs on the neck tool halves and from the slots into the atmosphere. This neck ring cooling is not very effective and in practical terms cannot be controlled.

According to U.S. Pat. No. 4,983,203, column 6, lines 5 to 7, the neck ring should be coolable secondarily by thermal conduction in the parison mold halves. However, this can work only so long as the parison mold halves are in their closed position and thus in contact with the neck ring (FIG. 6 of U.S. Pat. No. 4,983,203). For the rest, there is only a small temperature difference between the neck ring and the parison mold halves, so that one cannot count on a noticeable secondary cooling of the neck ring by thermal conduction. The parison mold halves are therefore cooled only in their open position (FIGS. 1 and 2 of U.S. Pat. No. 4,983, 203), in other words at times different from the secondary cooling of the neck ring. Each parison mold half has through-going, axially parallel cooling air passages which, in the open position of the parison mold halves, are aligned with a curved slot in a stationary cooling air chamber. Each slot is supplied with cooling air either through a branch passage (FIG. 4 of U.S. Pat. No. 4,983,203) and two inlet openings of the cooling air chamber or through two branch passages (FIG. 5 of U.S. Pat. No. 4,983,203) and a respective associated inlet opening of the cooling air chamber. By means of throttling or shutoff valves in the inlet openings, the supply of cooling air to the slot or slot halves can be varied. All inlet openings receive their cooling air from a common stationary air supply chamber (FIG. 2 of U.S. Pat. No. 4,983,203).

It is an object of the present invention to improve the cooling of the neck rings.

Additional objects, advantages and novel features of the invention will be set forth in part in the description which follows, and in part will become apparent to those skilled in the art upon examination of the following, or may be learned by practice of the invention. The objects and advantages of the invention can be realized and attained by the apparatus particularly pointed out in the appended claims.

SUMMARY OF THE INVENTION

Accordingly, the objects and advantages are achieved by the present invention as described herein. In the conventional manner the neck ring includes, in addition to the neck tool halves, an undivided guide ring for the pressing plunger in the case of a press-blow process, or for the plunger in the case of a blow-blow process. The guide ring is generally retained in place by an external flange engaging in a corresponding recess in the neck tool halves, and indeed is so located when the neck tool halves are in their open position. Thus, with cooling of the neck tool halves, the guide ring is likewise cooled as a secondary effect. For the cooling fluid one would generally use blown air at comparatively low pressure on cost-saving grounds. It is advantageous that in accordance with the invention, the cooling of the neck ring can be accomplished completely independently of the cooling of the parison mold halves. However, a common supply device for the cooling fluid can be provided for both a neck tool half and the associated parison mold half. For the cooling of the neck rings the whole of the cycle period can be used during which the neck rings are located in the parison mold station. If separate supply devices are to be used for the cooling of the neck rings, the characteristics of the cooling fluid used for the cooling of the neck rings can be adjusted in optimum manner. So far as these characteristics are concerned one is talking particularly about temperature and pressure of the cooling fluid. By virtue of the cooperation of supply device and distribution device, even with multiple mold operation, e.g. double and triple mold operation, one can achieve a uniform and fully effective cooling of the neck rings with little constructional cost. For this, the distribution devices in particular can be designed in optimum manner. A subsequent fitting out of existing glass molding machines with the cooling apparatus for the present invention for the neck molds is possible on a cost-effective basis.

Further embodiments are also provided. By extending the movable part of each distribution device radially outwards from its neck holder, the cooperation of the movable part with the rest of the apparatus is facilitated.

Furthermore, providing a dividing surface (cooperating aligned surfaces) that is inclined to the vertical between the movable part and the associated stationary part of each distribution device permits the parts of the distribution device to be aligned with each other comparatively easily.

A jointing gap provided between the stationary and movable parts of the distribution device is cost effective and free from wear. The losses of cooling fluid through the gap are held within limits when blown air at comparatively low pressure is used as the cooling fluid.

By providing a circumferential region of the neck tool halves opposite a final outlet of the movable part of each distribution device, and a further circumferential region of the neck tool halves opposite a final outlet of the stationary part of each distribution device, comparatively narrow spatial ratios can be achieved without damage occurring in the transportation of the neck rings from the parison mold to the finishing mold.

Each supply device can have a valve, which can be either a throttling valve and/or a shutoff valve.

By spacing the final outlet of each distribution device from the associated neck tool half, the neck tool halves may be blasted freely with the cooling fluid. The desired cooling effect can be adjusted accurately to any value, for example, by the choice of the magnitude of the separation.

To facilitate the achievement of a precise cooling effect and lead to comparatively low cooling fluid demands, the final outlet of each distribution device can have nozzle apertures directed towards the neck tool halves.

An internal cooling of the neck tool halves with particularly low cooling fluid requirements and reduced noise generation is possible by inlet apertures of cooling passages in the neck tool halves following the final outlet of each distribution device.

Additionally, a particularly low-loss transmission of the cooling fluid may be attained by making the stationary part of each distribution device adjustable in the direction of the longitudinal axis (or axes) of the neck ring.

Further features and advantages of the invention will become apparent from the following description of embodiments in accordance with the invention which are given by way of example and with reference to the drawings.

DETAILED DESCRIPTION OF THE INVENTION

Figure 1:
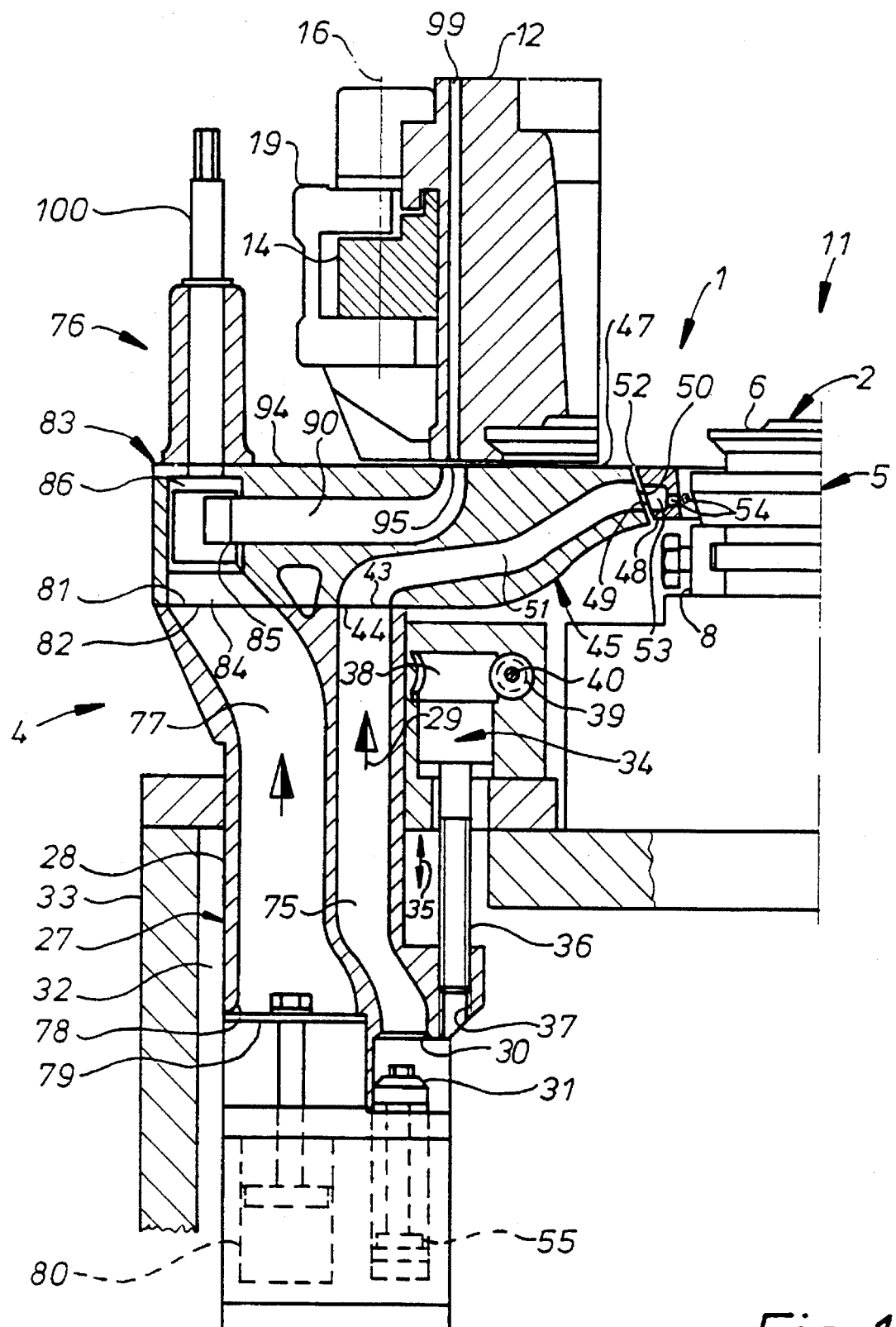
FIG. 1 is a schematic longitudinal section through a part of a first embodiment of an apparatus in accordance with the present invention.

FIG. 1 shows part of an apparatus 1 for the cooling of neck rings 2 and 3 (see also FIG. 2) of an IS (individual section) glass molding machine. The machine operates in the so-called double-mold format, in which two hollow glass articles are molded at the same time in each section 4 of the machine.

Figure 2:
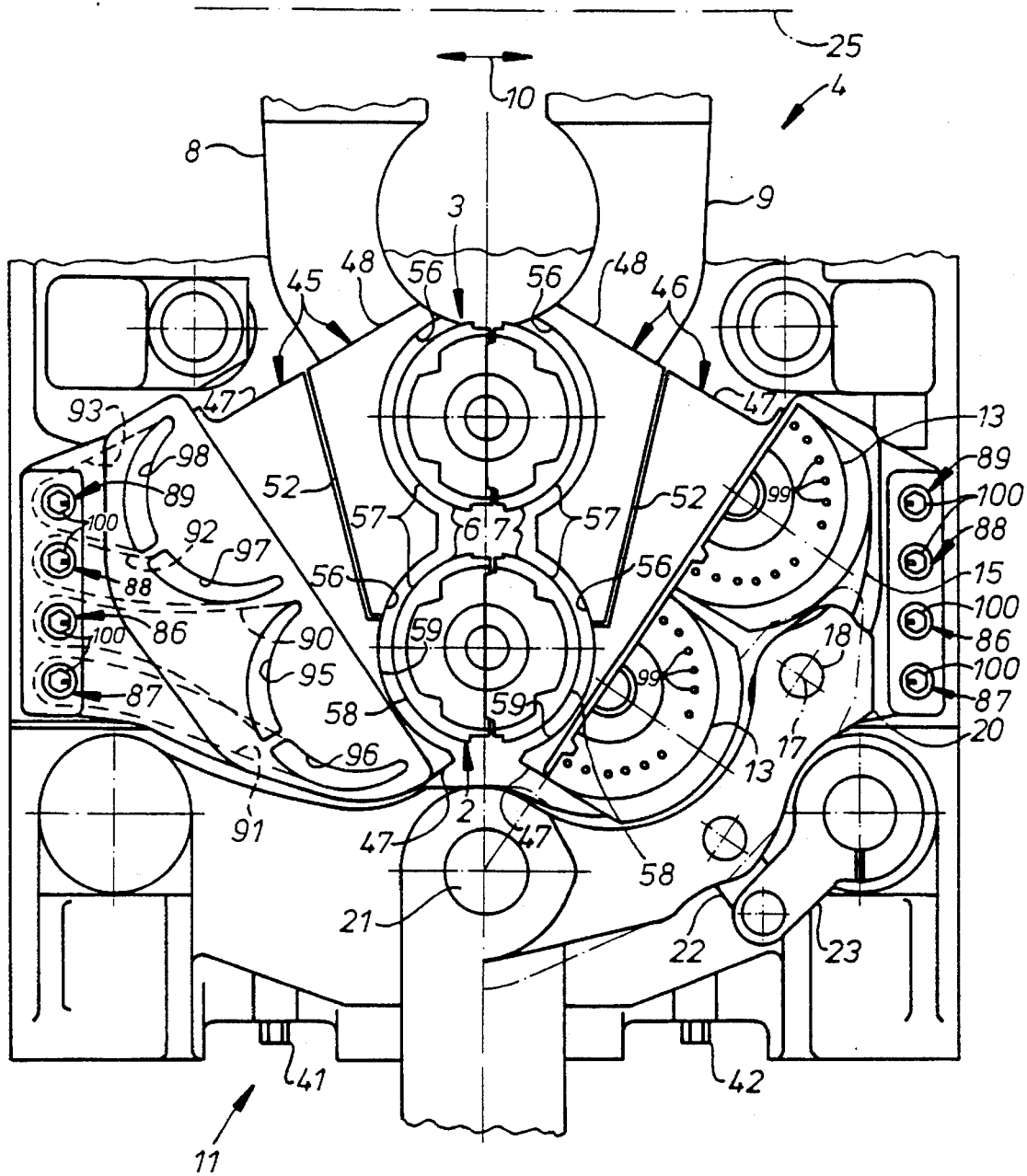
FIG. 2 is essentially the plan view of the embodiment shown in FIG. 1.

Each neck ring 2, 3 comprises a longitudinally divided neck tool 5 having neck tool halves 6 and 7 which are movable by means of neck tool holders 8 and 9 between a closed position as shown in FIGS. 1 and 2 and an open position. This movement takes place as indicated by a double arrow 10 in FIG. 2. In the customary manner each neck ring 2, 3 includes in addition to the neck tool halves 6, 7 an undivided guide ring (not shown in the drawings) for a pressing plunger in the case of a press-blow process or a plunger in the case of a blow-blow process, with the plunger being operative in a parison mold station 11. The guide ring is held by means of an external flange in a corresponding internal circumferential groove 69 (FIGS. 7 and 8) of the neck tool halves 6, 7 and indeed even when the neck tool halves 6, 7 are located in the open position.

In each operating cycle each neck ring 2, 3 cooperates first of all in the parison mold station 11 with parison mold halves 12 and 13 which are movable between a closed position and an open position. Each parison mold half 12, 13 is suspended in a manner known per se on a rocker 14 and 15. The respective rockers are pivotable within limits about longitudinal axes 16 and 17 of rocker pins 18 (FIG. 2). Each rocker pin 18 is a component of a parison mold holder 19 and 20 (FIG. 2), with the latter both being pivotable about a common pivot pin 21 (FIG. 2) and with each being pivotable by way of a connecting arm 22 through a crank 23 (FIG. 2).

After the opening of the parison mold halves 12, 13, a parison 24 (FIG. 7) produced in the parison mold station 11 by pressing or preliminary blowing is held by each of the further closed neck rings 2, 3. The parisons 24 are then transported, by rotation of the neck tool holders 8, 9 about a horizontal inversion axis 25 (FIG. 2), to a finishing mold station (not shown), where, in respective finishing molds, finished hollow glass articles are produced from the parisons by blowing. After this, according to the double-headed arrow 10 (FIG. 2), the neck tools 5 are opened in the finishing mold station, until the necks 26 (FIG. 7) of the hollow glass articles are freed. Then, the neck tool holders 8, 9 are rotated in the reverse sense about the inversion axis 25 into their initial positions in the parison mold station 11, whereupon a new operating cycle can then begin. In good time before the ending of this reverse rotation the neck tools 5 are closed again.

Within the framework of the apparatus 1 stationary supply devices 27 for a cooling fluid, particularly cooling air, are provided for the cooling of the neck rings 2, 3. Thus, one such stationary supply device 27 is associated with each of the neck tool holders 8, 9. Each supply device 27 comprises a cylindrical hollow body 28 with a supply passage 75 through which cooling fluid can flow in the direction of arrow 29 when its inlet 30 is opened by the actuation of a valve 31. The inlet 30 lies within a chamber 32 of a compartment 33 of the section 4 which is filled with cooling fluid under pressure in excess of atmospheric pressure, preferably blowing pressure.

For each supply device 27 there is provided on the compartment 33 a drive 34 by means of which the supply device 27 can be raised or lowered in the direction of a double-headed arrow 35. For this purpose a screw spindle 36 of the drive 34 engages with a threaded bore 37 at the lower end of the supply device 27. The threaded spindle 36 is secured to a worm wheel 38 which engages with a worm 39. The worm 39 is fixed on a shaft 40 which is manually rotatable at one end (FIG. 2) which is constructed as a nut 41 and 42. By means of this drive 34 the two supply devices 27 can be adjusted in terms of their height to any degree of sensitivity.

The cooling fluid exits from an outlet 43 of each supply passage 75 and enters an aligned inlet 44 of a distribution device 45 and 46 associated with the respective neck tool holders 8 and 9.

Each distribution device 45, 46 is divided into a stationary part 47 which is arranged in the parison mold station 11 and a part 48 which is arranged to be movable with the associated neck tool holder 8, 9. In an initial position for each neck ring 2, 3 (FIGS. 1 and 2) an inlet 49 of each entrainable part 48 of the distribution devices 45, 46 lies opposite an outlet 50 of the associated stationary part 47 of the distribution devices 45, 46.

From the inlet 44 the cooling fluid flows into a substantially wider air chamber 51 in each stationary part 47 until it reaches its outlet 50. From there the cooling fluid traverses a jointing gap 52 which is inclined to the vertical and passes in through the inlet 49 into an air chamber 53 of the entrainable part 48. As seen in FIG. 1, this jointing gap 52 is formed by a dividing surface, i.e., cooperating aligned surfaces between the stationary part 47 and the movable part 48. From the air chamber 53 the cooling fluid travels through a number of nozzle apertures 54 distributed around the circumference of the associated neck ring 2, 3 to project fluid freely against the external surface of the neck tool 5. As shown in FIG. 1, a part of the cooling fluid is caused to flow upwards from the nozzle apertures 54 and another part to flow downwards, so that one has a large surface area cooling of the neck tool 5.

This cooling can be effected independently of the operating position of the parison mold halves 12, 13 (FIG. 2) during the whole or during only a part of that period in which the neck rings 2, 3 are located in their initial positions as shown in FIGS. 1 and 2. The length of the actual cooling period is determined by the actuation of the valve 31 by a valve drive 55. For this purpose the valve 31 can either be fully opened or fully closed, or be set in intermediate positions for a throttling of the coolant flow. By means of such a throttling the extent of the cooling effect on the neck rings 2, 3 can be adjusted.

Because of the comparatively low pressure of the cooling fluid (blown air) the cooling fluid loss as a consequence through the jointing gap 52 is comparatively small. Moreover, the width of the jointing gap 52 can be adjusted by height adjustment of the supply device 27 and of the distribution device 45 which is secured thereto.

From FIG. 1 it can be appreciated that the entrainable part 48 of the distribution device 45 extends radially outwards from its neck tool holder 8. The manner of fixing of the entrainable part 48 to the neck tool holder 8 will be described hereinafter.

The arrangement of the jointing gap 52 so as to be inclined with reference to the vertical and which can be seen from FIG. 1 facilitates the return of the neck rings 2, 3 and the entrainable parts 48 to their initial positions as shown in FIGS. 1 and 2.

FIG. 1 shows also a part of a device 76 for the cooling of the parison mold halves 12, 13 (FIG. 2). For this, each supply device 27 comprises a further supply passage 77 for cooling fluid, especially cooling air. An inlet 78 to the further supply passage 77 can be opened or closed or throttled by a further valve 79 and draws cooling fluid from the chamber 32. The further valve 79 is arranged to be actuated by remote control through a valve drive 80.

An outlet 81 of the further supply passage 77 is permanently in communication with an inlet 82 of a further air chamber 84 of a further distribution device 83. Each further air chamber 84 is provided with four outlets 85, in each of which is arranged a throttling valve 86 to 89 (FIG. 2). Annexed to each throttling valve 86 to 89 is a branch chamber 90 to 93 (FIG. 2) of the further distribution device 83. Each branch chamber 90 to 93 issues in an upper surface 94 as an arcuate outlet slot 95 to 98 which extends almost through a quarter circle.

When the parison mold halves 12, 13 are located in their open position, a plurality of axially parallel cooling channels 99 in the walls of the associated parison mold halves 12, 13 and arranged on a circle are aligned with each outlet slot 95 to 98. With the parison mold halves 12, 13 open, cooling fluid can then flow through the cooling passages from the bottom upwards and thus cool the parison mold halves.

The extent of this cooling can be determined by adjustment of the throttling valves 86 to 89 each by means of a manually actuated valve stem 100.

In FIG. 1 the apparatus parts 1 and 76 on each side of the section 4 are combined into one structural unit. Alternatively, each supply passage 75 and the associated distribution device 45 or 46 on the one hand and each further supply passage 77 and the associated further distribution device 83 on the other hand could be structurally separated from each other. In the latter case the cylindrical hollow body 28, for example, would be divided into two, again cylindrical, parts along its length, with each of these parts being individually adjustable as to its height in relation to the associated distribution device 45;46;83 by means of a separate drive, e.g. 34.

From FIG. 2 it can be seen that a final outlet 56 of each entrainable part 48 defined by the nozzle apertures 54 lies opposite only a first circumferential region 57 of the neck tool halves 6,6 and 7,7. A further circumferential region 58 of each neck tool half 6,7 shown as the lower element in FIG. 2 lies opposite a final outlet 59 of the stationary parts 47 of the distribution devices 45, 46.

Figure 3:
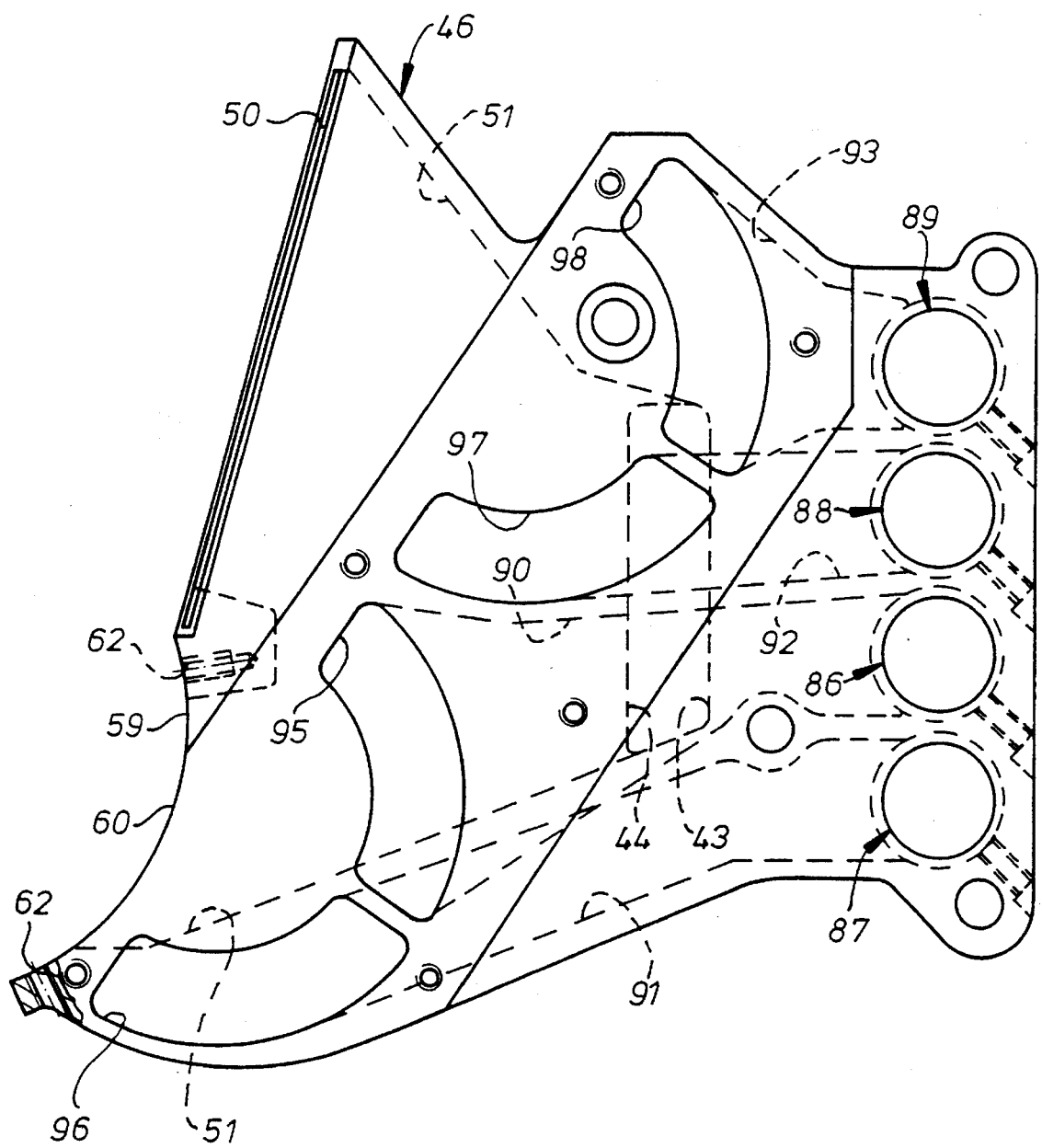
FIG. 3 shows a detail from FIG. 2 on an enlarged scale, FIG. 4 likewise shows a detail from FIG. 2 on an enlarged scale.

FIG. 3 illustrates that the outlet 50 is designed as a longitudinally extending slot. In the region of the final outlet 59, each distribution device 45, 46 has an arcuate contact surface 60 for a complementarily curved nozzle plate 61 (FIG. 4) and threaded bores 62 for its securement.

From FIG. 3 it can also be noted how the air chamber 51, starting from the inlet 44, broadens out up to the outlet 50 and up to the final outlet 59.

Figure 4:
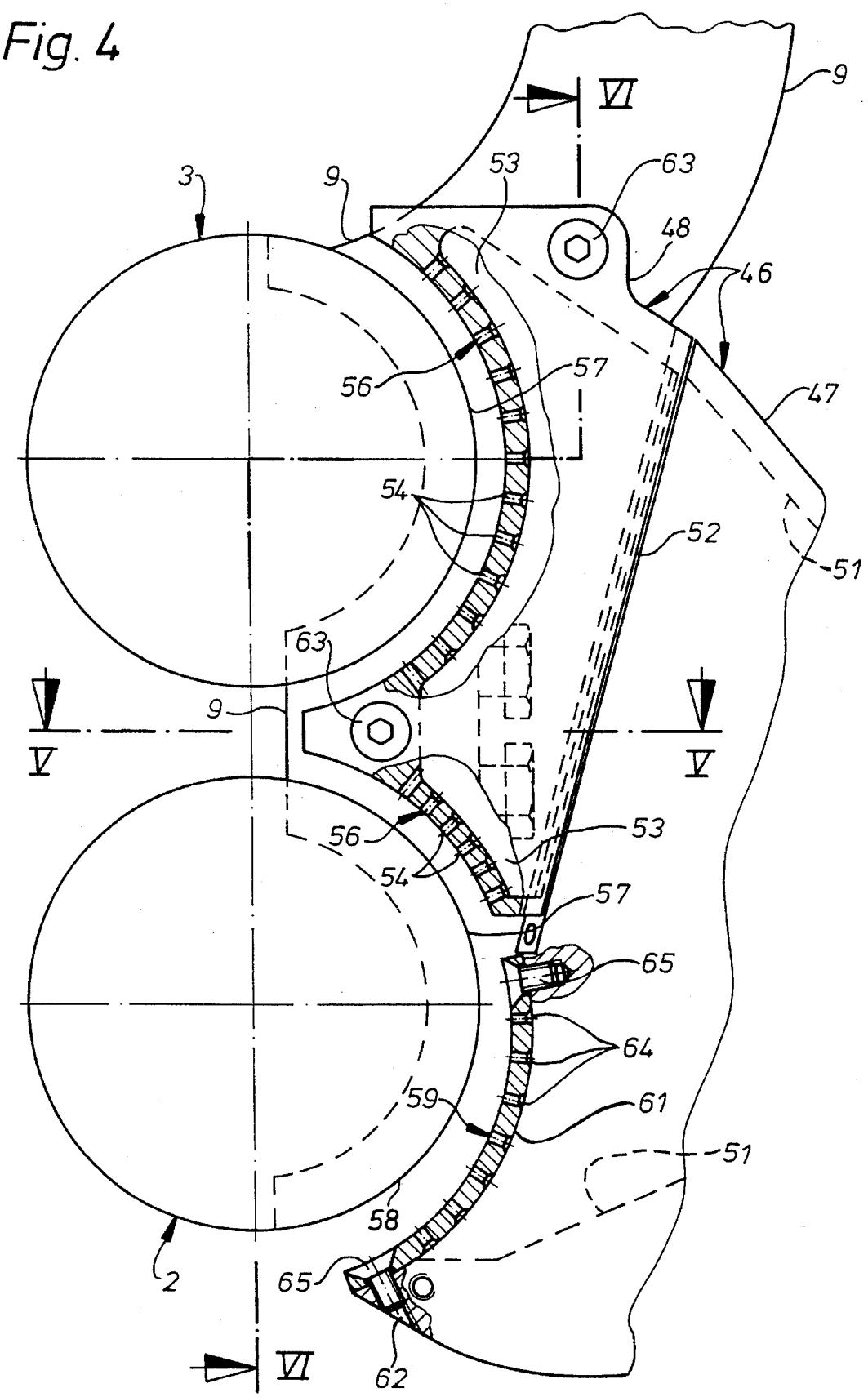

From FIG. 4 it can be seen that the entrainable part 48 of the distribution device 46 is secured by screws 63 to the neck tool holder 9. In the same way, although not shown here, the entrainable part 48 of the distribution device 45 is screwed onto the neck tool holder 8. By the arrangement and choice of diameter of the nozzle apertures 54, any desired cooling effect can be exerted on the first circumferential region 57 of each of the neck rings 2, 3.

The nozzle plate 61 is, as shown in FIG. 4, likewise provided with a plurality of nozzle apertures 64. It is held in place by screws 65 which are inserted into the threaded bores 62 (FIG. 3). The nozzle plate 61 has a larger radial distance from the neck ring 2 at its lower end as shown in FIG. 4 as compared with the distance at its upper end. Because of this, space is created for the movement of the neck ring 2 and its parison 24 (FIG. 7) when it is inverted about the inversion axis 25 (FIG. 2).

Figure 5:
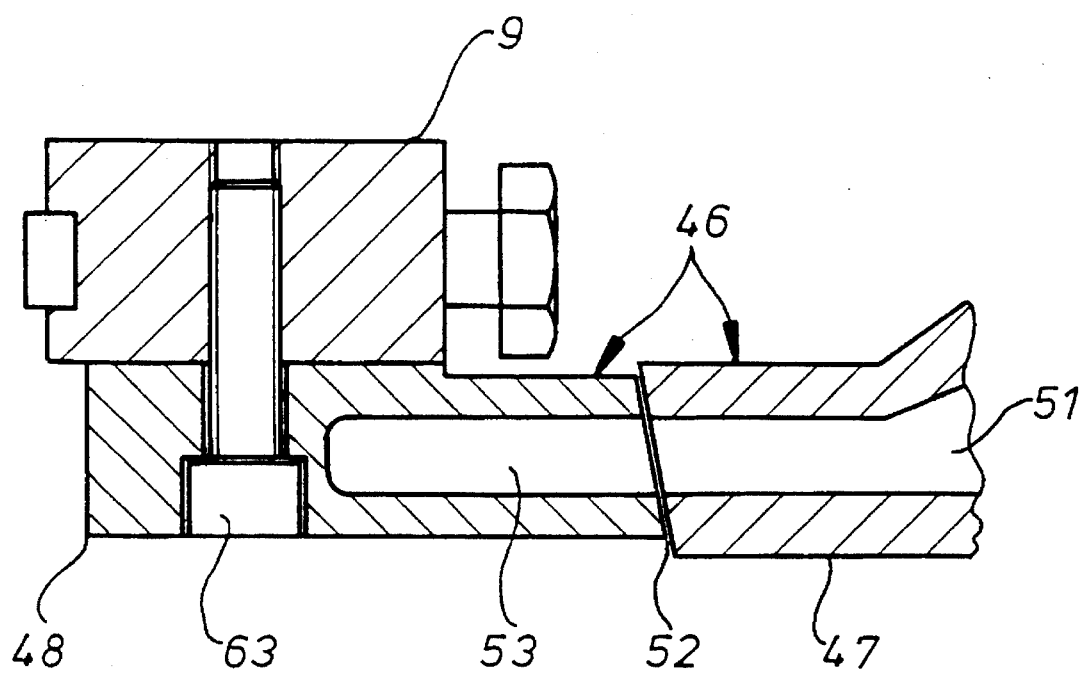
FIG. 5 is the sectional view taken along the line V—V in FIG. 4.

FIG. 5 illustrates the fastening of the entrainable part 48 by the screws 63 to the neck tool holder 9.

Figure 6:
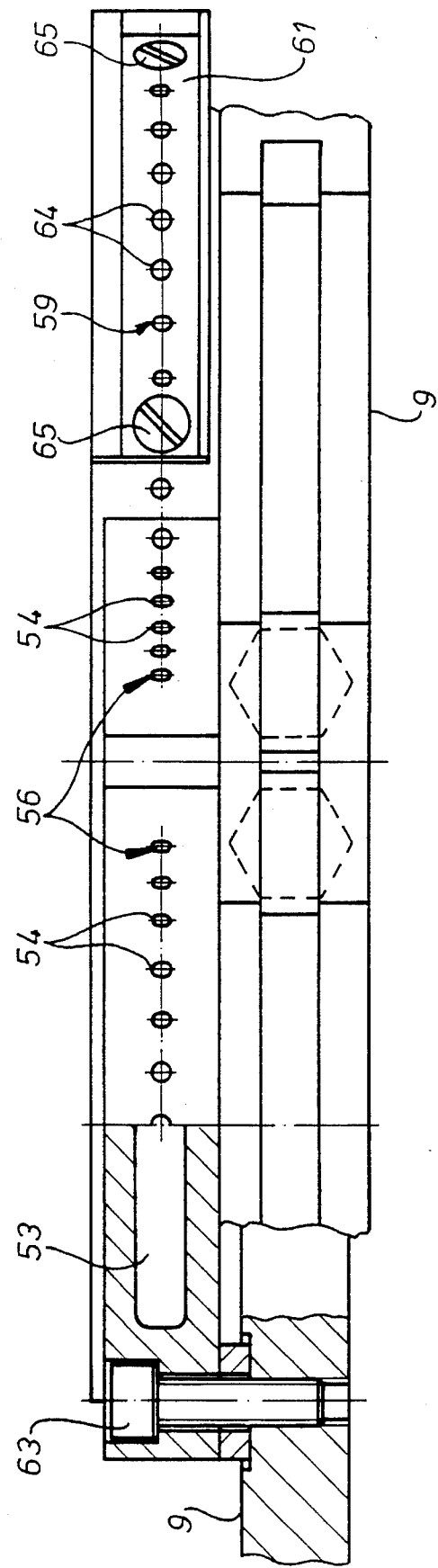
FIG. 6 is the sectional view taken along the line VI—VI in FIG. 4.

FIG. 6 shows further details of the device shown in FIG. 4.

Figure 7:
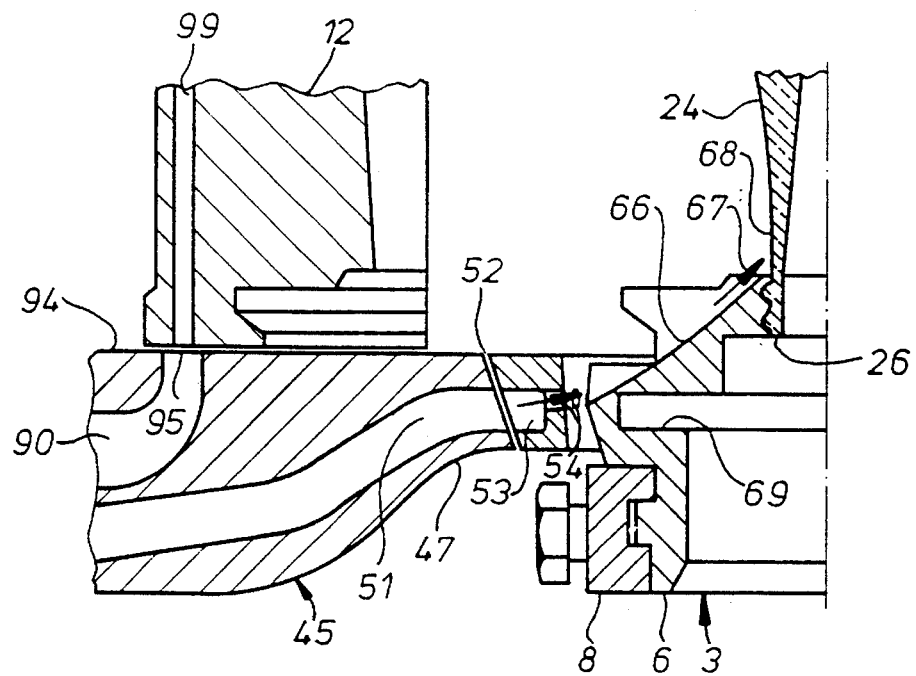
FIG. 7 shows a detail from FIG. 1 but of a different embodiment.

FIG. 7 shows a modification, in that here the cooling air exiting from the nozzle apertures 54 is blown not only against the outside of the neck tool half 6 but in part also into radial slots 66 in the outside of the neck tool half 6 in the direction of arrow 67 and thus impinges against a neck region 68 of the parison 24. The extent of this cooling of the neck region 68 which serves to stabilize the parison 24 can be varied according to the manner and arrangement of the slots 66 as well as their relative position in relation to the nozzle apertures 54. Also, the type, circumferential distribution and direction of the nozzle apertures 54 can have an influence on the cooling of the neck region 68.

In FIG. 7, for clarity, the undivided guide ring for the neck ring 3 is not shown. This guide ring is suspended by an external flange engaging in the internal circumferential groove 69 of the neck tool half 6.

Figure 8:
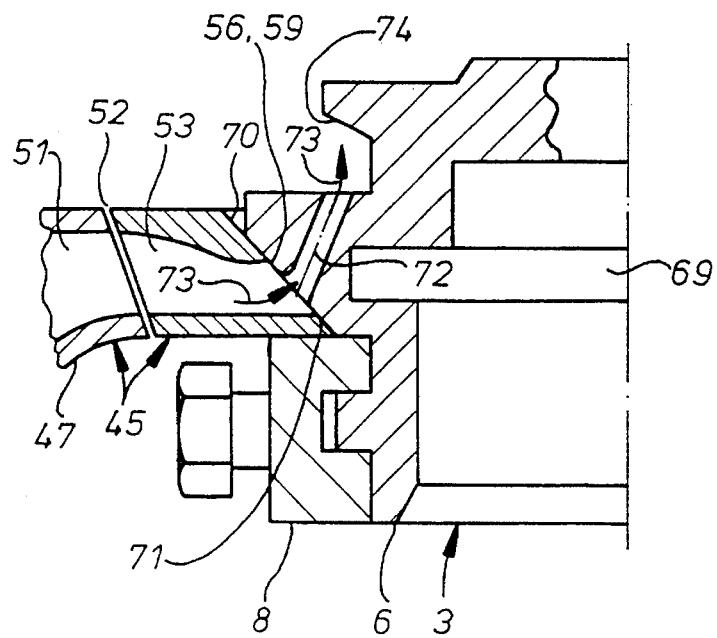
FIG. 8 shows a detail from FIG. 1 of yet another embodiment.

In the embodiment shown in FIG. 8 the final outlets 56, 59 of the distribution device 45 are preferably designed in the form of a circumferential slot in an end face 70. An opposing face 71 of the neck tool half 6, 7 is in direct contact with the end face 70. From the opposing face 71 there extends, distributed around the circumference, a plurality of cooling bores 72 through which the cooling fluid flows in the direction of arrows 73 into a recess 74 of the neck tool half 6, 7. Thus, a mixed cooling takes place, on the one hand through the walls of the cooling bores 72 and on the other hand through free blasting of boundary surfaces of the recesses 74.

It will be apparent to those skilled in the art that other modifications and variations can be made in the method and apparatus of the invention in broader aspects. Therefore, it is not limited to the specific details and illustrated examples shown and described. Accordingly, changes and modifications may be incorporated and embodied within the scope of the appended claims.

What is claimed is:

1. An apparatus for use in molding glass, comprising:

a neck ring for forming a mouth of a glass container, said neck ring comprising a longitudinally divided neck tool having neck tool halves, wherein each said neck tool half has a respective neck tool holder for moving said neck tool half between a closed and an open position;

a parison mold station for forming a parison, said parison being held and transportable by said neck ring from an initial position at said parison mold station to a finishing mold station;

a stationary supply device having an outlet for supplying a cooling fluid;

a distribution device having an inlet which cooperates with said outlet of said stationary supply device to receive said cooling fluid therefrom and at least one final outlet, said distribution device being associated with at least one said neck tool half and its respective neck tool holder to direct said cooling fluid through the at least one final outlet into contact with the associated neck tool half; and said distribution device being divided into a stationary part arranged in said parison mold station and a movable part which moves with the associated neck tool holder, said movable part having a movable part inlet which is positioned and arranged opposite and in cooperation with a stationary part outlet in said stationery part when said neck ring is in its initial position.

2. An apparatus in accordance with claim 1 wherein said movable part of said distribution device extends radially outward from its associated neck tool holder.

3. An apparatus in accordance with claim 2 wherein said movable part and said stationary part of said distribution device have cooperating aligned surfaces, said surfaces being inclined to the vertical axis of said apparatus when said neck ring is in its initial position.

4. An apparatus in accordance with claim 1 wherein said movable part and said stationary part of said distribution device have cooperating aligned surfaces, said surfaces being inclined to the vertical axis of said apparatus when said neck ring is in its initial position.

5. An apparatus according to claim 1 wherein a jointing gap is defined between said stationary part and said movable part of said distribution device when said neck ring is in its initial position.

6. An apparatus according to claim 1 wherein said at least one final outlet comprises at least one first final outlet disposed in said movable part and at least one second final outlet disposed in said stationary part, and wherein said associated neck tool half has a first and a second circumferential region, said first circumferential region lies opposite said at least one first final outlet, and said second circumferential region lies opposite said at least one second final outlet.

7. An apparatus according to claim 1 further comprising a valve in said stationary supply device.

8. An apparatus according to claim 1 wherein said at least one final outlet is spaced from said associated neck tool half when the neck ring is in its initial position.

9. An apparatus according to claim 8 wherein said at least one final outlet of said distribution device has nozzle apertures directed towards said associated neck tool half.

10. An apparatus according to claim 1 wherein the associated neck tool half comprises cooling bores having inlet apertures, said apertures being in fluid communication with said at least one final outlet of said associated distribution device.

11. An apparatus according to claim 1 wherein said stationary part is adjustable in the direction of a longitudinal axis of said neck ring.

12. An apparatus according to claim 1, wherein said at least one final outlet is adapted to direct cooling fluid into contact with a neck region of said parison held by said neck ring.

13. An apparatus for cooling a neck ring forming the mouth of a glass container in a glass molding machine, comprising:

said neck ring comprising a longitudinally divided neck tool, said divided neck tool comprising neck tool halves, wherein each said neck tool half has a respective neck tool holder for moving the neck tool halves between a closed position and an open position;

a parison mold station for forming a parison, said parison being held and transportable by the neck ring between said parison mold station and a finishing mold station, and wherein the neck ring is returnable from said finishing station to an initial position at said parison mold station;

a stationary supply device associated with each neck tool holder for supplying cooling fluid, each stationary supply device having an outlet for the cooling fluid;

a distribution device associated with each said neck tool half and respective neck tool holder, each said distribution device having an inlet positioned and arranged in cooperation with said stationary supply device outlet associated therewith for receiving the cooling fluid therefrom;

wherein each said distribution device has at least one final outlet through which the cooling fluid is directed into contact with said associated neck tool half; and wherein each said distribution device is divided into a stationary part arranged in said parison mold station and a part movable with said associated neck tool holder, said movable part having an inlet which is positioned and arranged opposite and in cooperation with an outlet in said stationary part when the neck ring is in said initial position.

14. An apparatus in accordance with claim 13 wherein said movable part of each said distribution device extends radially outward from its said associated neck tool holder.

15. An apparatus in accordance with claim 14, wherein said movable part and said stationary part of each distribution device comprise cooperating aligned surfaces which are inclined to the vertical axis of said apparatus when said neck ring is in its initial position.

16. An apparatus in accordance with claim 13 wherein said movable part and said stationary part of each distribution device comprise cooperating aligned surfaces which are inclined to the vertical axis of said apparatus when said neck ring is in said initial position.

17. An apparatus according to claim 13 wherein a jointing gap is defined between said stationary part and said movable part of said distribution device when said neck ring is in said initial position.

18. An apparatus according to claim 13 wherein each final outlet comprises at least one first final outlet in said movable part and at least one second final outlet in said stationary part, and wherein each neck tool half comprises a first and a second cicumferential region, said first circumferential region lies opposite said at least one first final outlet, and said second circumferential region lies opposite said at least one second final outlet.

19. An apparatus according to claim 13 further comprising a valve in each stationary supply device.

20. An apparatus according to claim 13 wherein said at least one final outlet is spaced from said associated neck tool half when the neck ring is in its initial position.

21. An apparatus according to claim 20 wherein said at least one final outlet of each distribution device has nozzle apertures directed towards said neck tool halves.

22. An apparatus according to claim 13 wherein said neck tool halves comprise cooling bores having inlet apertures which fluidly communicate with said at least one final outlet of said associated distribution device.

23. An apparatus according to claim 13 wherein said stationary part of each distribution device is adjustable in the direction of a longitudinal axis of said neck ring.

24. An apparatus according to claim 13, wherein said at least one final outlet is adapted to direct said cooling fluid into contact with a neck region of said parison held by said neck ring.

* * * * *

UNITED STATES PATENT AND TRADEMARK OFFICE
CERTIFICATE OF CORRECTION

PATENT NO. : 5,516,352
DATED : May 14, 1996
INVENTOR(S) : Hermann Bögert et al.

It is certified that error appears in the above-indentified patent and that said Letters Patent is hereby corrected as shown below:

Column 8:
Claim 12, line 2 after "direct" insert --said--.
Column 10:
Claim 18, line 5 delete "cicumferential" and insert --circumferential--.

Claim 18, line 5 delete "circuferential" and insert --circumferential--.

Signed and Sealed this

Fifth Day of November, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,516,352
DATED : May 14, 1996
INVENTOR(S) : Hermann Bögert et al.

It is certified that error appears in the above-identified patent and that said Letters Patent is hereby corrected as shown below:

On title page, item [73] change "Opernkirchen" to --Obernkirchen--.

Signed and Sealed this

Twenty-second Day of April, 1997

Attest:

BRUCE LEHMAN

*Commissioner of Patents and Trademarks*

*Attesting Officer*